United States Patent [19]

Fannin

[11] Patent Number: 4,629,256
[45] Date of Patent: Dec. 16, 1986

[54] FLUID PRESSURE BRAKING SYSTEM
[75] Inventor: Richard C. Fannin, Grafton, Ohio
[73] Assignee: Allied Corporation, Morristown, N.J.
[21] Appl. No.: 730,965
[22] Filed: May 6, 1985
[51] Int. Cl.[4] .............................................. B60T 11/10
[52] U.S. Cl. ...................................... 303/8; 303/6 M; 303/7
[58] Field of Search ...................... 303/2, 6 M, 7, 8, 9, 303/13, 40, 71

[56] References Cited

U.S. PATENT DOCUMENTS

| Re. 25,969 | 3/1966 | Valentine | 303/29 |
|---|---|---|---|
| 2,979,069 | 4/1961 | Valentine | 137/102 |
| 3,228,730 | 1/1966 | Schubert | 303/8 X |
| 3,718,372 | 2/1973 | Gruner et al. | 303/7 |
| 4,017,125 | 4/1977 | Durling | 303/7 |
| 4,368,926 | 1/1983 | Bartholomew | 303/7 |

Primary Examiner—Duane A. Reger
Attorney, Agent, or Firm—Ken C. Decker; William N. Antonis

[57] ABSTRACT

A fluid pressure braking system for a tractor-trailer vehicle in which the braking system of the tractor is connected to the braking system of the trailer through trailer control and trailer supply lines includes a relay valve which controls communication between service reservoirs on the tractor and the trailer control line in response to operation of the vehicle brake valve. Use of the relay valve to control the communication to the trailer control line permits greater volumes of air to be supplied to the trailer control line, thereby appreciably reducing transmission times of brake application signals.

9 Claims, 1 Drawing Figure

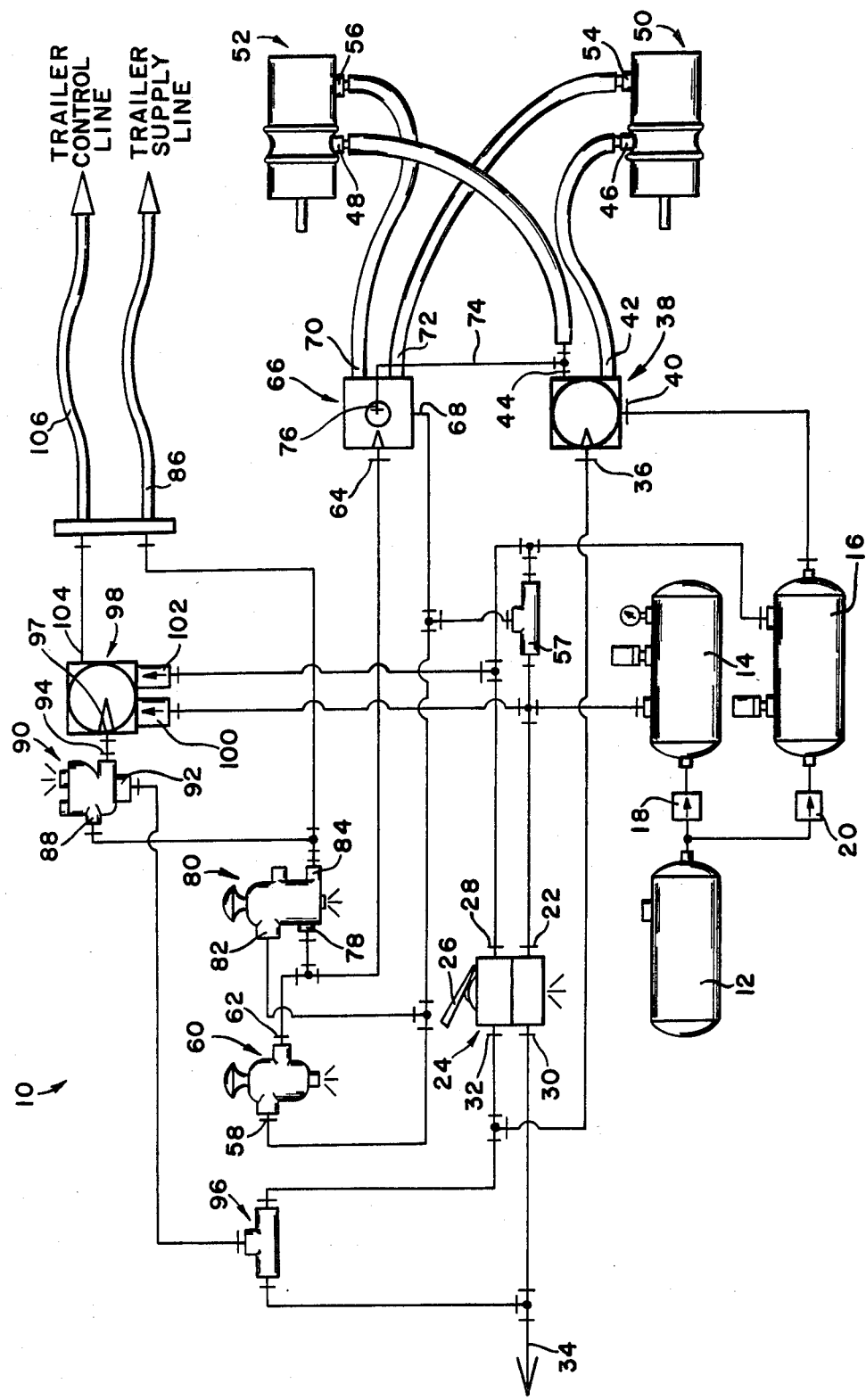

FLUID PRESSURE BRAKING SYSTEM

This invention relates to a fluid pressure braking system.

Existing tractor-trailer combination vehicles use a trailer supply line and a trailer control line to communicate the braking system on the tractor with the braking system on the trailer. The trailer supply line communicates air pressure to the storage reservoirs on the trailer, and also supplies hold-off pressure to the spring brakes on the trailer. Accordingly, the trailer spring brakes are actuated when the supply line is vented. The trailer control line transmits a signal from the operator-actuated brake control valve on the tractor to the trailer braking system to thereby communicate the reservoirs on the trailer with the trailer service brakes to effect a service brake actuation. The trailer control line and the trailer supply line are normally communicated through a tractor protection valve which is carried by the tractor. When the tractor and trailer are hitched together, the tractor protection valve merely transmits the signal through the trailer control line and transmits pressure throught the trailer supply line, but when the tractor is operated without a trailer or during trailer breakaway, the tractor protection valve automatically shuts off the trailer control line and trailer supply line. Typical prior art tractor protection systems are disclosed in U.S. Pat. No. 2,979,069 issued Apr. 11, 1961 to Valentine and in U.S. Pat. No. Re. 25,969 issued Mar. 1, 1966 to Valentine.

One problem with prior art braking systems is that a finite time period is required to transmit the braking signal from the vehicle brake valve on the tractor to the service brakes on the trailer. It is clearly desirable to reduce these transmission times as much as possible. The present invention uses a relay valve to control communication to the trailer control line from the fluid pressure reservoirs on the tractor. The relay valve is operated by the conventional operator-actuated brake control valve in the operator's compartment. However, the relay valve is able to communicate fluid pressure in substantially greater quantities to the trailer control line than was possible through the brake valve itself. Accordingly, signal transmission time between the brake valve and the brakes on the trailer is significantly reduced.

These and other advantages of the present invention will become apparent from the following description, with reference to the accompanying drawing, the sole figure of which is a schematic illustation of a fluid pressure braking system made pursuant to the teachings of my present invention.

Referring now to the drawing, a fluid pressure braking system generally indicated by the numeral 10 is carried on the tractor portion of a tractor-trailer combination vehicle and includes a supply reservoir 12 which is charged by the vehicle air compressor (not shown), which is powered by the vehicle engine. Fluid pressure is communicated from reservoir 12 into supply reservoirs 14, 16 through conventional one-way check valves 18, 20. Pressure in the reservoir 14 is communicated to the supply port 22 of a conventional dual brake valve generally indicated by the numeral 24 which is operated by movement of a treadle 26 mounted in the vehicle operator's compartment. The reservoir 16 is communicated to the supply port 28 of the brake valve 24. When a brake application is to be effected, the treadle 26 is operated to cause the valve 24 to communicate the supply port 22 with its corresponding delivery port 30 and to simultaneously communicate the supply port 28 with its corresponding delivery port 32. The delivery port 30 is communicated to the front wheel brakes (not shown) of the tractor through brake line 34. The delivery port 32 of the brake control valve 24 is communicated to a control port 36 of a conventional relay valve 38. Relay valve 38 is responsive to a signal at its control port 36 to communicate supply port 40 of relay valve 38, which is communicated with the reservoir 16, to the delivery ports 42, 44 of relay valve 38. The delivery ports 42, 44 are communicated to service ports 46, 48 of tandem service and spring brake actuators 50, 52. Actuators 50, 52 are responsive to pressure at service ports 46, 48 thereof to effect a service brake application. The tandem actuators 50, 52 are conventional and need not be discussed further herein. Actuators 50, 52 include a spring brake actuator which is held in its released condition by fluid pressure communicated to spring brake ports 54, 56 of the actuators 50, 52, as will be discussed hereinafter.

The supply reservoirs 14 and 16 are communicated to the supply ports of double check valve 57. A supply port 58 of an operator-actuated, push-pull valve generally indicated by the numeral 60, which may be, for example, made pursuant to the teachings of U.S. Pat. No. 3,166,358 to Valentine is communicated to the delivery port of double check valve 57. Supply valve 60 is mounted in the operator's compartment and is operable to either communicate supply port 58 with delivery port 62 thereof, or to break communication between the ports 58, 62 and to communicate the port 62 to atmosphere. The delivery port 62 is communicated to a control port 64 of a conventional spring brake control valve generally indicated by the numeral 66. The supply port 68 of the spring brake control valve 66 is communicated to the supply reservoirs 14 and 16 via double check valve 57. The spring brake control valve 66 is responsive to a signal at the control port 64 to communicate the supply port 68 with delivery ports 70, 72 which are communicated to the spring brake control ports 54, 56 of the tandem actuators 50, 52. The spring brake control valve 66 is also responsive to the release of fluid pressure at control port 64 to vent the ports 54, 56 to thereby effect a spring brake application. A pressure line 74 communicates delivery port 44 of relay valve 38 with anti-compounding port 76 of spring brake control valve 66 to assure that a spring brake actuation is not effected at the same time that a service brake application is effected.

The delivery port 62 of the valve 60 is also communicated to a control port 78 of a conventional push-pull control valve generally indicated by the numeral 80. The valve 80 is similar to the valve 60 and is disclosed in detail in U.S. Pat. No. 3,790,222 issued Feb. 5, 1974 to Fannin. Operation of the valves 60 and 80 is identical, except that the valve 80 also responds to a release of pressure at control port 78 to move to the position terminating communication between supply port 82 and delivery port 84 thereof. Both valves 60 and 80 respond to a drop of pressure at their corresponding delivery ports 62, 84 or supply ports 58, 82 to close communication between their corresponding supply and delivery ports and by venting their delivery ports. Supply port 82 of the valve 80 is also communicated to the supply reservoirs 14 and 16 via double check valve 57, and the delivery port 84 of valve 80 is communicated to the trailer supply line 86. Delivery port 84 is also communicated to a control port 88 of a pilot-operated control valve generally indicated by the numeral 90.

The pilot-operated control valve 90 is conventional, and is responsive to a pressure signal at control port 88 to initiate communication between supply port 92 and delivery port 94 thereof. Supply port 92 of the valve 90 is connected to a double check valve generally indicated by the numeral 96. The check valve 96 is communicated to the delivery ports 30, 32 of the brake valve 24 and selects the higher of the pressures at the delivery ports 30, 32 for communication to the supply port 92 of the valve 90. The delivery port 94 is preferably mounted for direct communication into a control port 97 of a conventional relay valve generally indicated by the numeral 98. Relay valve 98 is provided with supply ports which are communicated with the reservoirs 14, 16 respectively through one-way check valves 100, 102. Relay valve 98 further includes a delivery port 104 which is connected directly to the trailer control line 106. Relay valve 98 may be identical to the relay valve 38 and is responsive to a pressure level at the control port 97 thereof to initiate communication between the supply ports thereof to the delivery port 104. In the alternative, the relay valve 98 can be designed so that a smaller pressure at the control port 97 results in a substantially greater pressure at the delivery port 104.

In operation, the vehicle operator starts the vehicle engine to charge the reservoirs 12, 14 and 16. When the vehicle is to be moved, the valves 60 and 80 are operated to connect their corresponding supply ports with the corresponding delivery ports. Accordingly, fluid pressure is communicated to the spring brake ports 54, 56 of tandem actuators 50, 52 to release the spring brakes and is also communicated through trailer supply line 86 to charge the braking system on the trailer. At the same time, fluid pressure is delivered to the control port 88 of pilot-operated control valve 90, causing the latter to initiate communication between the supply port 92 and delivery port 94 thereof. It will be noted, however, that until a brake application is effected, no fluid pressure will be communicated between the ports 90, 94.

When the vehicle is in motion and a service brake application is effected, treadle 26 is operated to actuate the valve 24 to thereby communicate the supply port 28 with delivery port 32 and to simultaneously communicate the supply port 22 with delivery port 30. Accordingly, fluid pressure is delivered to the front wheel brakes (not shown) of the vehicle through line 34 and is simultaneously communicated to the control port 36 of relay valve 38 which initiates a service brake application by delivering air to service brake control ports 46, 48 of tandem brake actuators 50, 52. Operation of the valve 24 also communicates fluid pressure to both supply ports of the double check valve 96, which selects the higher of the pressures from delivery ports 30, 32 of brake valve 24 for communication to supply port 92 of the valve 90 which is held open to permit communication between the ports 92, 94 by pressure communicated from valve 80. Accordingly, fluid pressure is delivered through the valve 90 to the control port 97 of relay valve 98, thereby communicating the trailer control line 106 directly with reservoirs 14, 16 due to operation of the relay valve 98. The check valves 100, 102 are necessary to prevent back-flow in case one of the reservoirs 14 or 16 fails.

If the lines 86, 106 become disconnected, or a failure of the trailer braking system occurs, pressure drop in the line 86 automatically causes the valve 80, as discussed hereinabove, to move to a position blocking communication between the ports 82, 84. When this occurs, the control signal is automatically removed from the control port 88 of the valve 90, thereby causing the latter to terminate communication between the ports 92, 94 thereof. Accordingly, even though a service brake application is effected on the tractor by operation of the valve 24, air loss from the tractor cannot occur because of the blocking effect of the valve 90. It should also be noted that whenever the trailer is operated in the "bob-tail" mode, i.e., without a trailer, the valve 80 is similarly closed to block communication to delivery port 84, thereby also closing the valve 90 to prevent communication through the trailer control line 106. Accordingly, the braking system on the tractor is protected if either the lines 86, 106 become disconnected, if the trailer braking system fails, or the vehicle is operated in the bob-tail mode without a trailer.

I claim:

1. Fluid pressure braking system for tractor-trailer combination vehicle comprising a fluid pressure source on said tractor, a trailer supply line and a trailer control line communicating a portion of the fluid pressure braking system on the tractor with a portion of the fluid pressure braking system on the trailer, means for controlling communication to the trailer control line from said fluid pressure source, said means for controlling communication to the trailer control line including relay valve means having a supply port communicated to said fluid pressure source, a delivery port communicated to said trailer control line, and a control port, first operator-actuated valve means for controlling communication between said pressure source and the control port of the relay valve means, said relay valve means responding to pressure at said control port to communicate the supply and delivery ports of the relay valve means to therby communicate the trailer control line to said fluid pressure source, one-way check valve means for permitting fluid communication from said fluid pressure source into said supply port of the relay valve means but preventing communication in the reverse direction, and second operator-actuated valve means for controlling communication to said trailer supply line, said means for controlling communication to the trailer control line including valve mechanism communicated to the control port of the relay valve means to terminate communication to said control port when the trailer supply line is vented.

2. Fluid pressure braking system as claimed in claim 1, wherein said valve mechanism includes a supply port communicated to said first operator-actuated valve means, a delivery port communicated to the control port of the relay valve, and a control port communicated to the pressure level in said trailer supply line, said valve mechanism being responsive to the pressure level at its control port to cut off communication between the supply port of the valve mechanism and the delivery port of the valve mechanism when the pressure level at the control port of the valve mechanism drops below a predetermined level.

3. Fluid pressure braking system as claimed in claim 2, wherein said second operator-actuated valve means includes a supply port communicated to said pressure source and a delivery port communicated to said trailer supply line and to the control port of said valve mechanism, said second operator-actuated means being responsive to loss of pressure in said trailer supply line to cut off communication between its supply and delivery ports and to vent its delivery port.

4. Fluid pressure braking system as claimed in claim 1, wherein said fluid pressure source includes a pair of reservoirs isolated from one another, said relay valve means including a pair of supply ports communicated to a corresponding reservoir, said one-way check valve means permitting communication to each of said supply ports, but preventing communication in the reverse direction.

5. Fluid pressure braking system as claimed in claim 4, wherein said first operator-actuated valve means is a dual brake valve having a pair of supply ports and a pair of delivery ports, each of said supply ports being communicated with a corresponding one of said reservoirs, said first operator-actuated valve means being actuated to communicate each of said supply ports to a corresponding one of said delivery ports, and means for selecting the pressure at one of said delivery ports for communication to the control port of said relay valve means.

6. Fluid pressure braking system as claimed in claim 5, wherein said means for controlling communication to the trailer control line includes valve mechanism communicated to the control port of the relay valve means to terminate communication to said control port when the trailer supply line is vented.

7. Fluid pressure braking system as claimed in claim 6, wherein said valve mechanism includes a supply port communicated to said selecting means, a delivery port communicated to the control port of the relay valve, and a control port communicated to the pressure level in said trailer supply line, said valve mechanism being responsive to the pressure level at its control port to cut off communication between the supply port of the valve mechanism and the delivery port of the valve mechanism when the pressure level at the control port of the valve mechanism drops below a predetermined level.

8. Fluid pressure braking system as claimed in claim 7, wherein said second operator-actuated valve means includes a supply port communicated to said pressure source and a delivery port communicated to said trailer supply line and to the control port of said valve mechanism, said second operator-actuated means being responsive to loss of pressure in said trailer supply line to cut off communication between its supply and delivery ports and to vent its delivery port.

9. Fluid pressure braking system as claimed in claim 4, wherein said second operator-actuated valve means includes a supply port communicated to said pressure source and a delivery port communicated to said trailer supply line and to the control port of said valve mechanism, said second operator-actuated means being responsive to loss of pressure in said trailer supply line to cut off communication between its supply and delivery ports and to vent its delivery port.

* * * * *